A. A. RUTTAN & C. E. HUTCHINGS.
PHOTOGRAPHIC FILM PACK.
APPLICATION FILED NOV. 5, 1915.

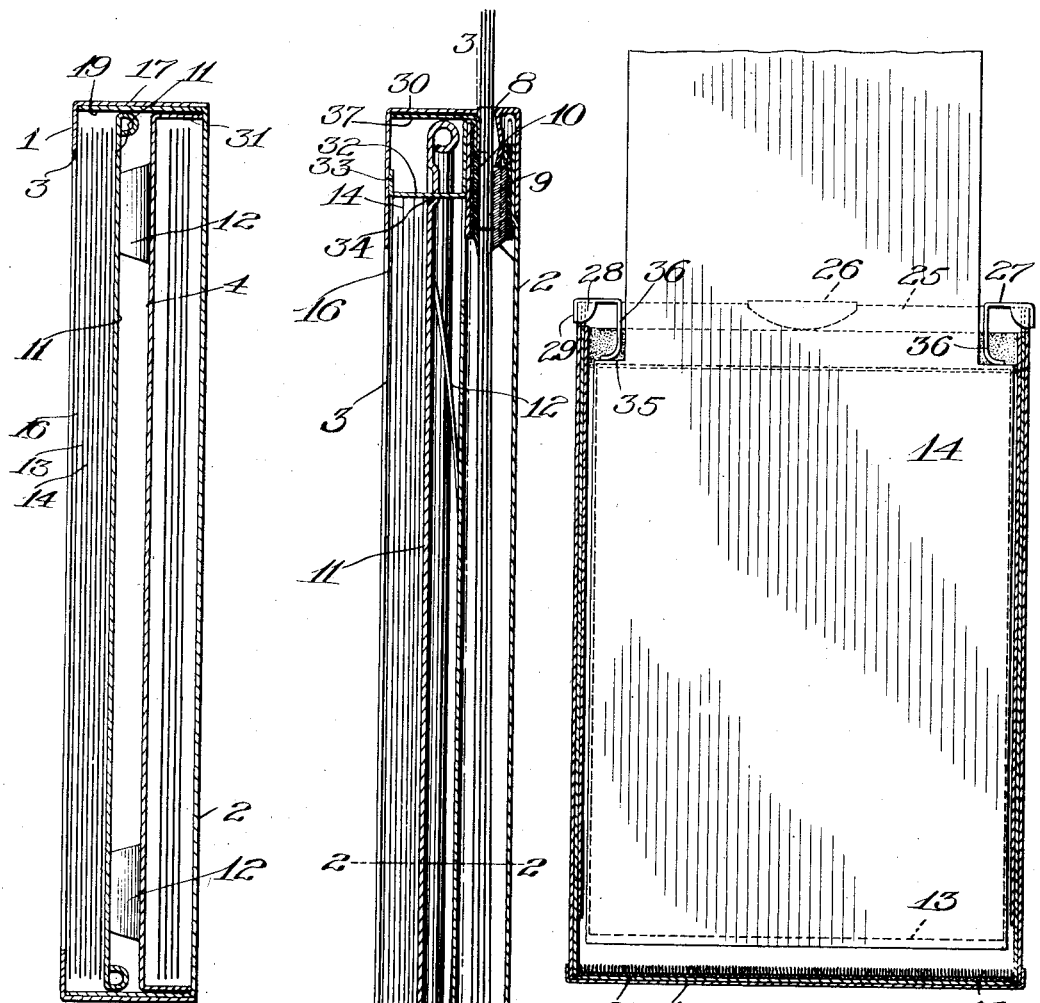

1,219,588.

Patented Mar. 20, 1917.
2 SHEETS—SHEET 2.

Inventors
Alfred A. Ruttan
Charles E. Hutchings

Witness

UNITED STATES PATENT OFFICE.

ALFRED A. RUTTAN AND CHARLES E. HUTCHINGS, OF ROCHESTER, NEW YORK, ASSIGNORS TO EASTMAN KODAK COMPANY, OF ROCHESTER, NEW YORK, A CORPORATION OF NEW YORK.

PHOTOGRAPHIC-FILM PACK.

1,219,588.        Specification of Letters Patent.        Patented Mar. 20, 1917.

Application filed November 5, 1915. Serial No. 59,861.

*To all whom it may concern:*

Be it known that we, ALFRED A. RUTTAN and CHARLES E. HUTCHINGS, of Rochester, in the county of Monroe and State of New York, have invented certain new and useful Improvements in Photographic-Film Packs; and we do hereby declare the following to be a full, clear, and exact description of the same, reference being had to the accompanying drawings, forming a part of this specification, and to the reference-numerals marked thereon.

Our present invention relates to photography and more particularly to film packs which consist of a casing adapted to be inserted in the focal plane of the camera and to contain flexible film sheets which are transferable between an exposing chamber and a storage chamber by means manipulated from the exterior. Our invention has for its object to provide a film pack so constructed that it is adapted to be made conveniently from sheet metal instead of paper or other material and to be assembled with greater ease and certainty. A further object of the invention is to provide means whereby a selected one of a plurality of films may be withdrawn from the pack independently of the others and without injuring them or destroying the serviceability of the pack. The improvements are further directed toward interior arrangements, notably, the mounting of the follower for holding the film compressed and to these and other ends the invention resides in certain improvements and combinations of parts all as will be hereinafter more fully described, the novel features being pointed out in the claims at the end of the specification.

In the drawings:

Figure 1 is a longitudinal section through a film pack constructed in accordance with and illustrating one embodiment of our invention taken substantially in the plane of the axis of the lens;

Fig. 2 is a transverse section taken substantially on the line 2—2 of Fig. 1;

Fig. 3 is a section on a reduced scale taken substantially on the line 3—3 of Fig. 1;

Similar reference numerals throughout the several views indicate the same parts.

Figure 4:
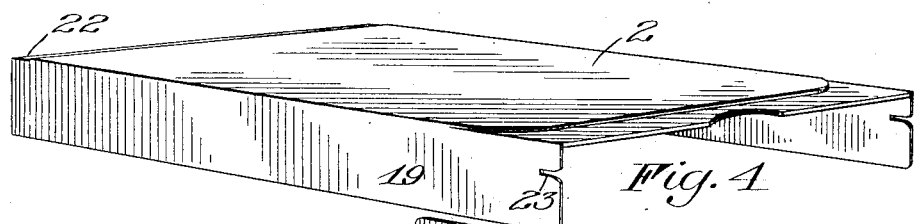
Fig. 4 is a perspective view of the rear casing member.

Referring to Fig. 1, we will first briefly describe the general construction and functions of the pack. It consists of a casing composed of a front member 1 and a back member 2, the former being provided with an exposure opening 3 defined in the picture area. The interior of the casing is divided by a substantially fixed partition member 4 into an exposing chamber 5 and a storage chamber 6 that communicate with each other around the end of the partition through a light seal 7. An opening 8 at the opposite or top end of the storage chamber 6 is also normally closed by a light seal half of which is carried by the casing member 2 at 9 and the other half by a partition member 4 at 10. A follower 11 movable in the exposure chamber 5 is pressed by springs 12 in a forward direction to clamp the film sheets 13 tightly against the margins of the exposure opening 3. Each film sheet is attached to a black paper or other protective backing 14 which conceals the film beneath and by being extended around the curved end 15 of the follower 11, past the light seal 7 and up through the storage chamber 6 to emerge at the opening 8, forms a means exteriorly accessible for manipulating the films to draw them from the exposure chamber 5 into the storage chamber 6 after which the backing may be torn off. A protective cover 16 for the first film that covers the exposure opening of the fresh pack is formed like one of these backings.

Figure 6:
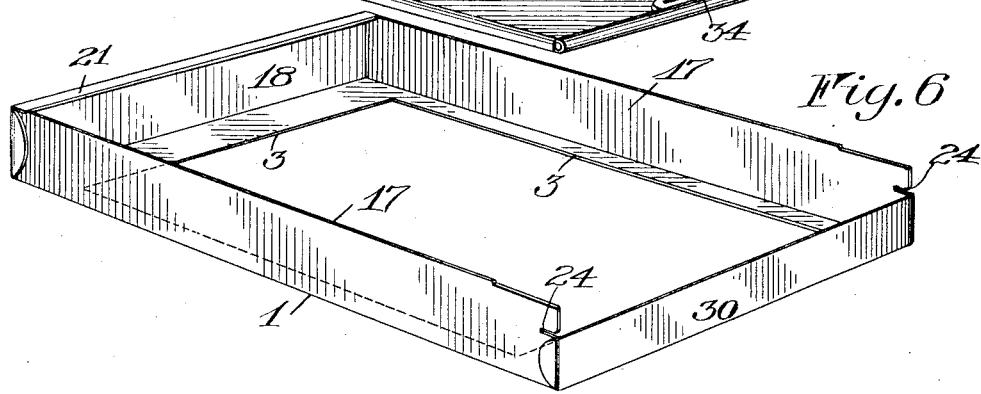
Fig. 6 is a perspective view of the front casing member.
Figure 7:
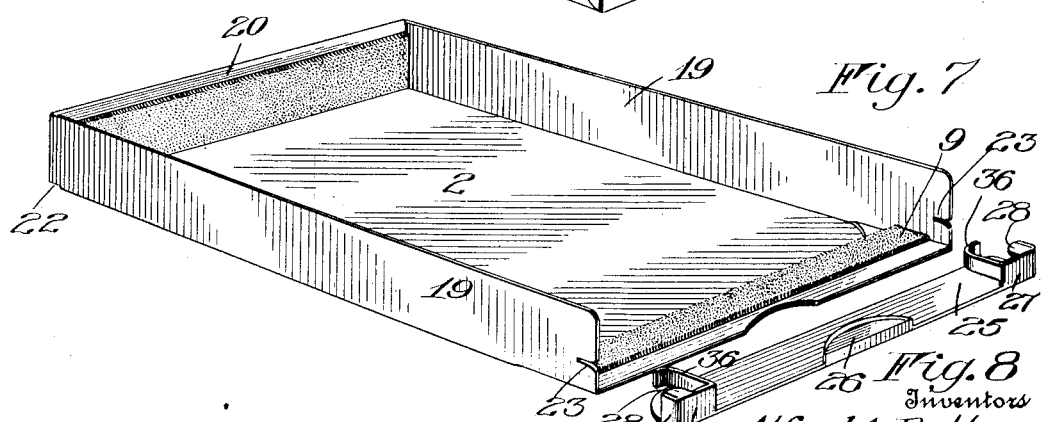
Fig. 7 is another perspective view of the rear casing member showing its front face.
Figure 8:
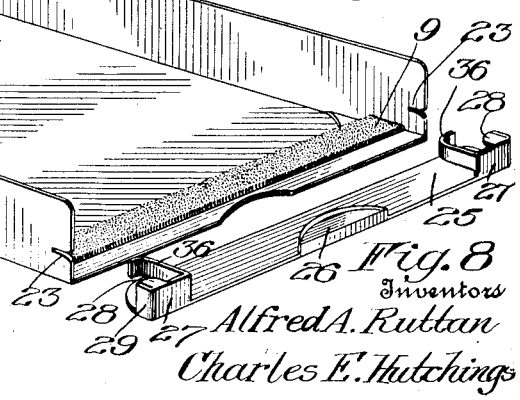
Fig. 8 is a perspective view of the clip that secures the casing members together and performs other functions.

In the practice of our invention, we make the outer casing of thin sheet metal and construct the front part as shown in detail in Fig. 6 and the back part as shown in Figs. 4 and 7. They are provided on three sides with flanges 17 and 18 and 19 and 20, respectively, which overlap as the parts are placed together in telescopic relationship. The front member 1 has an overhanging flange 21 on the end wall of flange 18 beneath which the corresponding portion of the rear member 2 is slipped to interlock the parts at this end. The said member 2 preferably has its wall depressed or countersunk as at 22 to let in the flange 21 and make an unbroken face, as shown in Fig. 1. As the two parts come together at the opposite or top end, notches 23 in the ends of the side flanges 19 are brought into register with similar notches 24 in the side flanges 17 of the front member. A removable clip 25 that is detachably engaged over the backing or wall of the rear member 2 by means of a spring tongue 26 has ears 27 at opposite ends that position it on the edge of the member and from which extend tongues 28 that enter the notches 23 and 24 and lock the two parts of the casing together after they have been interlocked at the other end in the manner described. Tongues 29 are also turned down from the ears 27 to embrace the outer faces of the side flanges adjacent to the notches. A flange 30 at the top end of the front member 1 extends over toward the clip 25 and provides one edge of the opening 8 previously described, as shown in Fig. 1.

The partition member 4 is positioned within the casing by rearwardly turned side flanges 31 that engage the back of the rear member 2 and define the minimum depth of the storage chamber 6 while the flange 32 projects forwardly at the top of the partition member and has a foot 33 abutting the front wall of the front member 1. The flanges 31 and 32 will thus be seen to definitely space the walls of the opening 8 through which the film manipulating tabs are drawn.

Figure 5:
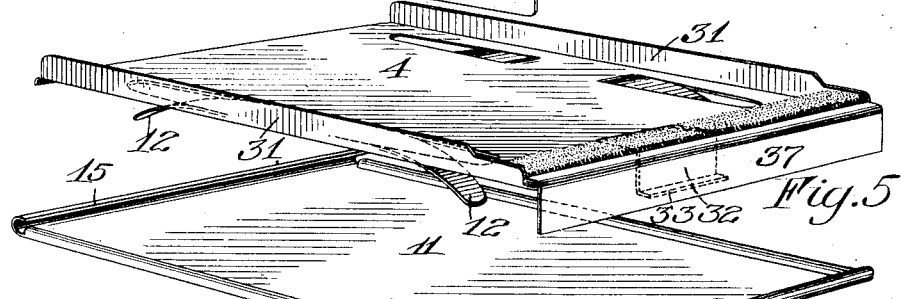
Fig. 5 is a perspective view of both the partition member and the follower illustrating their relationship to each other.

The flange 32 is preferably narrow, as indicated in Fig. 5, and is utilized as a supporting and guiding means for the follower 11 which latter has a slot 34 at the top to accommodate it.

Aside from the function of releasably securing the two parts of the casing together, the clip 25 also acts in another capacity. The films 13 or their backings 14 are provided with stop shoulders 35 for limiting the withdrawing movement after the films have been fully drawn into the storage chamber 6 and which halt the backings in position for their exteriorly projecting portions to be torn off. In the further practice of our invention, we provide abutments for the engagement of these stop shoulders 35 in the form of rounded tongues 36 proceeding from the ears 27 on the clip 25 down into the opening 8 through the light seal 9—10. This is not only a convenient way of providing the abutments but they are thus made detachable with the clip which, when removed, does not affect the light seal or permit the entrance of light at any point but does permit the ready withdrawal either of all of the films or of any individual film that may be selected without disturbing the others. This is of advantage, for instance, when it is desired to remove one film for development before all of the films have been exposed and drawn into the storage chamber. In film packs as usually constructed heretofore, the pack and particularly the casing are destroyed in order to remove the films.

The partition member 4 is preferably provided with a forwardly turned marginal flange 37 at the top which hugs the underside of the flange 30 on the front part of the casing and prevents all possibilty of light entering the exposing chamber 5 from the opening 8.

A film pack constructed in accordance with this invention is not only light and strong but is easy to assemble or "load" in the first instance and correspondingly convenient for the manipulations of the operator in use, as just described.

We claim as our invention:

1. In a photographic film pack, the combination with a case and a partition member therein dividing it into exposure and storage chambers, the former being provided with an exposure opening, of a follower for pressing the films toward the latter and having an opening therein and an extension on the partition member extending through the opening in the follower and serving as a guide for the follower.

2. In a photographic film pack, the combination with a case and a partition member therein dividing it into exposure and storage chambers, the former being provided with an exposure opening, of a follower for pressing the films toward the latter and having a slot therein and an extension on the partition member adapted to hold it spaced from the opposite wall of the exposure chamber, said extension coöperating with the slot in the follower to serve as a guide for the latter.

3. In a photographic film pack, the combination with a partition member and films adapted to be drawn from one side to the other of said partition member, of an outer casing supporting the partition member to form therewith light tight chambers for the film, said casing consisting of two telescoping flanged members, and detachable and replaceable means for locking said members together.

4. In a photographic film pack, the combination with a partition member and films adapted to be drawn from one side to the other of said partition member, of an outer casing supporting the partition member to form therewith light tight chambers for the film, said casing consisting of two telescoping flanged members adapted to be slid into interlocking engagement with each other at one end and a separate releasable means for locking them together at the other end.

5. In a photographic film pack, the combination with a partition member and films adapted to be drawn from one side to the other of said partition member, of an outer casing consisting of two telescoping flanged members having registering slots therein and a clip engaging over one of the members and occupying the slots to lock the members together.

6. In a photographic film pack, the combination with a partition member and films adapted to be drawn from one side to the other of said partition member, of an outer casing supporting the partition member to form therewith light tight chambers for the film, said casing consisting of two telescoping flanged members and a detachable clip for locking them together.

7. In a photographic film pack, the combination with a casing having exposure and storage chambers and a light-tight opening at one end of one of said chambers, and a plurality of films arranged in the other chamber and having manipulating means extending through the opening and stop shoulders, of a removable clip engaging over a wall of the casing and having fingers extending into the opening to engage the stop shoulders and prevent withdrawal of the films.

8. In a photographic film pack, the combination with a casing composed of two telescoping members having overlapping side flanges provided with registering openings, said casing comprising exposure and storage chambers and a light-tight opening at one end of one of said chambers, of a plurality of films arranged in the other chamber and having manipulating means extending through the opening and stop shoulders, and a removable clip engaging over a wall of the casing and having fingers extending into the opening to engage the stop shoulders and prevent withdrawal of the films, said clip being also provided with portions occupying the slots in the side flanges of the casing members to lock them together.

ALFRED A. RUTTAN.
CHARLES E. HUTCHINGS.

Witnesses:
 RUSSELL B. GRIFFITH,
 HARRIET T. VAY.